(12) United States Patent
Freeman et al.

(10) Patent No.: US 7,900,556 B2
(45) Date of Patent: Mar. 8, 2011

(54) METHOD FOR AUTOMATED APPLICATION OF INOCULANTS ONTO FORAGE MATERIALS AND MEASUREMENT OF MOISTURE FOR OPTIMUM APPLICATION

(75) Inventors: Steve Freeman, Windsor, CO (US); Wes Byers, Loveland, CO (US); Michael Van Lith, Harrisburg, SD (US); Dean Nordhues, Kearney, NE (US); Chad Greiman, Wellington, CO (US)

(73) Assignee: Lextron, Inc., Greeley, CO (US)

( * ) Notice: Subject to any disclaimer, the term of this patent is extended or adjusted under 35 U.S.C. 154(b) by 0 days.

(21) Appl. No.: 12/769,887

(22) Filed: Apr. 29, 2010

(65) Prior Publication Data
US 2010/0257833 A1 Oct. 14, 2010

Related U.S. Application Data

(63) Continuation of application No. 12/421,392, filed on Apr. 9, 2009, now Pat. No. 7,743,699.

(51) Int. Cl.
*B30B 15/20* (2006.01)

(52) U.S. Cl. ............................................. 100/74; 56/341

(58) Field of Classification Search .................... 100/73, 100/74, 88, 75, 92, 99, 102, 44; 56/341, 56/10.2 B; 324/695, 694, 696
See application file for complete search history.

(56) References Cited

U.S. PATENT DOCUMENTS

| | | | |
|---|---|---|---|
| 4,205,514 A | 6/1980 | Wolrab | |
| 4,228,638 A | 10/1980 | Rabe et al. | |
| 4,327,537 A * | 5/1982 | Wolrab | ................................ 56/1 |
| 4,352,267 A | 10/1982 | Mellinger | |
| 4,453,460 A | 6/1984 | Rabe et al. | |
| 4,455,930 A * | 6/1984 | Crawford | ........................... 100/3 |
| 4,459,798 A | 7/1984 | Penfold et al. | |
| 4,584,522 A | 4/1986 | Varela | |
| 4,916,888 A | 4/1990 | Sheehan et al. | |
| 4,918,910 A | 4/1990 | Sheehan et al. | |
| 4,929,904 A * | 5/1990 | Bohman et al. | ................ 324/696 |
| 5,136,831 A | 8/1992 | Fell et al. | |
| 5,842,335 A | 12/1998 | Esau | |

(Continued)

OTHER PUBLICATIONS

Gazeeka Agri-Business Instrumentation, Product Page, 7 pages, www.gazeeka.com.au/, accessed Jul. 22, 2009.

(Continued)

*Primary Examiner* — Árpád Fábián-Kovács
(74) *Attorney, Agent, or Firm* — Sheridan Ross, P.C.

(57) ABSTRACT

Real time data measurements are taken for relative humidity and moisture content of the forage material in order to timely adjust the dispense rate of the inoculant applied to the forage material. Data gathering capabilities are provided with this system controller to enable an operator to view, adjust, and record various production records, as well as detailed information as to the amounts of inoculant applied. The components associated with the system of the present invention includes an inoculant bin or container including a dispense auger which dispenses a controlled amount of inoculant which is then conveyed to the intake opening of the baling machine the forage material enters the machine. The control system includes various sensors positioned at the intake opening of the baling machine which measures moisture content, and optionally the mass or volume of the incoming forage material. The control system provides a number of user interface options for controlling the dispensing of the inoculant product, as well as capturing data relating to the operation of the baling machine and the application of the inoculant product.

9 Claims, 14 Drawing Sheets

U.S. PATENT DOCUMENTS

| | | | |
|---|---|---|---|
| 5,913,801 A * | 6/1999 | Bottinger et al. | 56/10.2 R |
| 6,088,657 A * | 7/2000 | McMahon | 702/50 |
| 6,109,008 A | 8/2000 | Staheli | |
| 6,185,990 B1 | 2/2001 | Missotten et al. | |
| 6,377,058 B1 | 4/2002 | Pemrick | |
| 6,437,582 B1 | 8/2002 | Rode et al. | |
| 6,726,559 B2 * | 4/2004 | Bischoff | 460/1 |
| 6,925,793 B2 * | 8/2005 | Schlesser et al. | 56/341 |
| 7,194,851 B2 | 3/2007 | Kraus et al. | |
| 7,261,032 B2 | 8/2007 | Schlesser et al. | |
| 7,340,996 B1 | 3/2008 | Viaud | |
| 7,370,575 B2 | 5/2008 | Kraus et al. | |
| 7,415,924 B2 * | 8/2008 | Roberts | 100/102 |
| 7,621,111 B2 * | 11/2009 | Roberts | 56/10.2 B |
| 2003/0093979 A1 * | 5/2003 | Fukumori et al. | 53/587 |
| 2003/0159421 A1 * | 8/2003 | Trelstad et al. | 56/341 |
| 2004/0250694 A1 * | 12/2004 | Lynde | 100/8 |
| 2005/0189953 A1 | 9/2005 | Stehr et al. | |
| 2006/0201344 A1 | 9/2006 | Taylor et al. | |
| 2007/0273394 A1 * | 11/2007 | Tanner et al. | 324/664 |
| 2009/0120202 A1 * | 5/2009 | Diekhans et al. | 73/861.02 |

OTHER PUBLICATIONS

Upon information and belief, the materials shown as AGCO Corporation,7344 & 7444 Large Square Balers, www.agcocorp.com, 2008 in this IDS were sold or appeared in a publicly available publication more than one year prior to the filing of the present application.

* cited by examiner

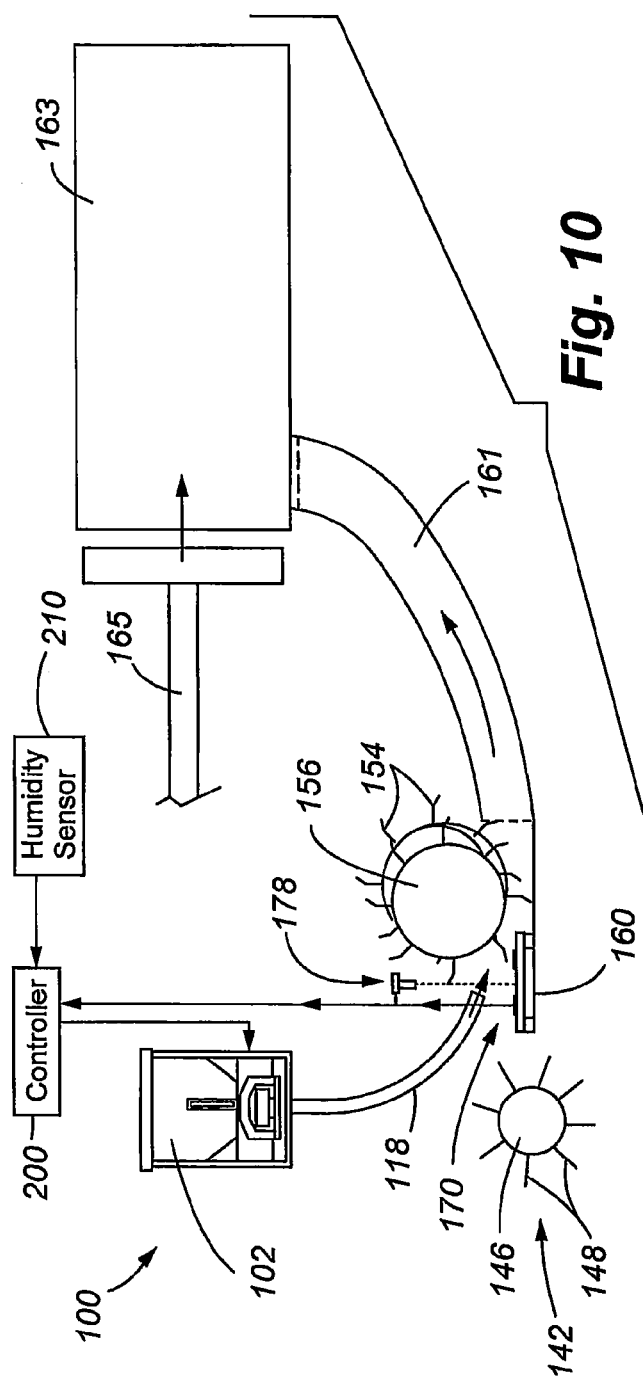
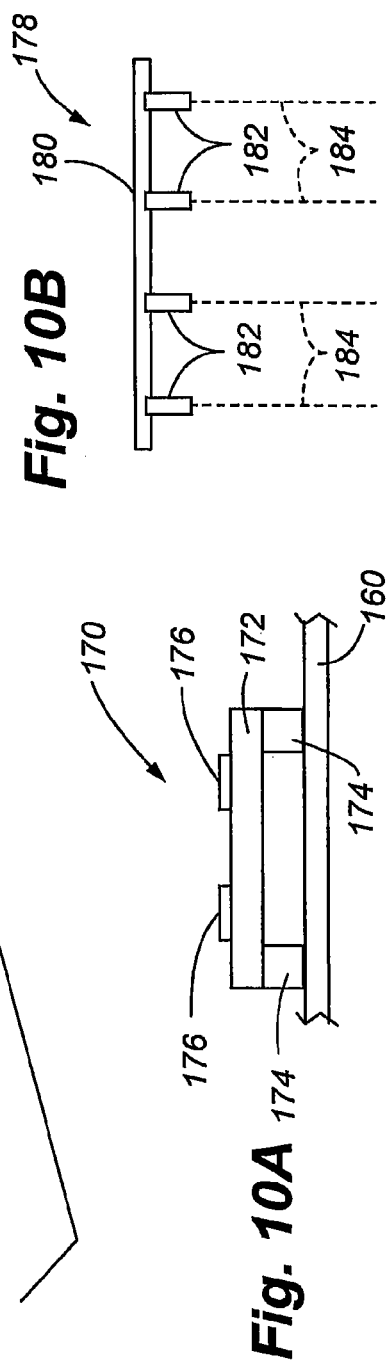
Fig. 10
Fig. 10A
Fig. 10B

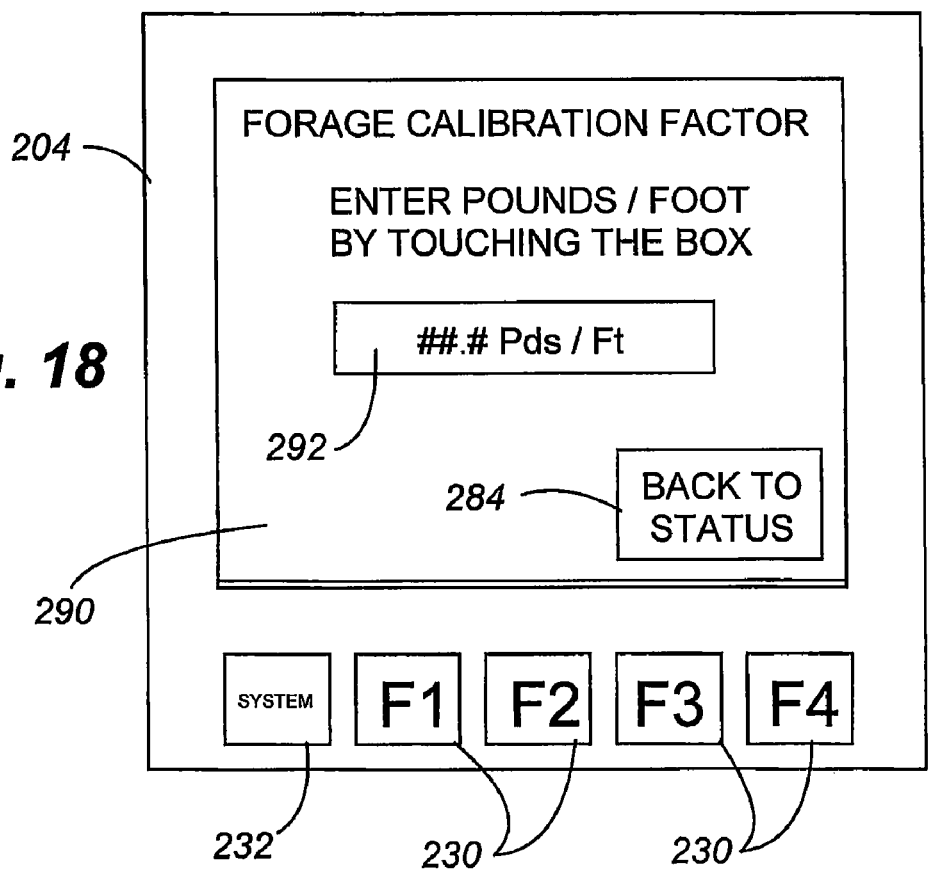

METHOD FOR AUTOMATED APPLICATION OF INOCULANTS ONTO FORAGE MATERIALS AND MEASUREMENT OF MOISTURE FOR OPTIMUM APPLICATION

CROSS REFERENCE TO RELATED APPLICATIONS

The present application is a continuation of U.S. application Ser. No. 12/421,392, filed Apr. 9, 2009, entitled "System and Method for Automated Application of Inoculants onto Forage Materials," which is incorporated by reference in its entirety herein.

FIELD OF THE INVENTION

The present invention relates to a system and method for applying inoculants or conditioners to forage material used to feed livestock, and more particularly, to a system and method in which the amount of inoculants applied is automatically corrected to account for changes in the moisture content of the forage material, the relative humidity of the environment, and other factors.

BACKGROUND OF THE INVENTION

Inoculants or conditioning materials may be applied to treat various types of animal feed when the animal feed is harvested. Forage materials such as hay crops and corn may be treated upon harvesting in which inoculants are applied to the crops during baling or chopping of the crops. Both liquid and dry inoculants/conditioners may be applied in order to achieve a number of purposes to include conditioning the forage material for an increased storage life that prolongs the nutritional value of the forage material.

It is known in the art to apply inoculants to forage materials that have been chopped/baled in automated baling and chopping equipment. For example, it is known to selectively apply inoculants to the harvested crops wherein certain parameters are measured, and the amount of inoculants applied is adjusted to account for the measured parameters. Moisture content of the harvested crop is one measured parameter. However, one noteworthy shortcoming with respect to many prior art systems is that the moisture content of the harvested crop is not measured until that particular portion of the crop has been baled. Therefore, any adjustments made in terms of the type/amount of inoculants applied is conducted retrospectively, and not based upon the actual portion of the harvested crop that enters the baling/chopping machine. This retrospective analysis of the moisture content can result in very inaccurate and otherwise undesirable changes in application of the inoculants since it is well known that moisture content can widely vary in closely adjacent sections of the harvested crop. For example, a field which hosts a crop may have randomly scattered depressions or a slope resulting in a portion of the field lying in an area that naturally collects water and moisture in general. Shading of the field in various locations also results in very different moisture contents depending upon when the crop is harvested during the day.

It is difficult to accurately measure the moisture content of a windrow of forage material entering the intake of a baling machine. As the windrow enters the machine, it is laterally dispersed and must be funneled into a smaller area prior to entering the compaction chamber of the baling machine. Accordingly, this difficulty in measuring moisture content at the intake is why many prior art systems measure moisture content when the forage material is highly compressed in the bail since the compressed forage material is much easier to measure for moisture. This inherent difficulty in measuring moisture at the intake of the baling/chopping machine, coupled with the retrospective moisture analysis in the prior art devices, results in an inaccurate application of adjusted amounts of applied inoculants.

Therefore, there is a particular need for a system and method for applying inoculants to forage material in which the amount of inoculants applied may be adjusted in real time based upon a prospective analysis of measured parameters so that adjusted amounts of inoculants are applied to the actual portions of the forage material in which the parameters were measured.

There is also a need for capturing and recording data regarding measured parameters associated with the harvested crop and the inoculants applied to the harvested crop. This data can be used for production records, cost analysis, and other commercial needs.

There is also a need to provide a user friendly system and method in which an operator of the system can selectively apply inoculants to the forage material both in manual and automatic modes.

There is also a need for providing a system which can be easily incorporated into existing baling/chopping machines without significantly altering the operation of the existing machine.

Each of the above needs is met with the present invention as described below.

SUMMARY OF THE INVENTION

In accordance with the present invention, a system and method are provided for automated application of inoculants onto forage materials in which the amounts applied can be varied by a prospective analysis of the un-baled forage material.

In accordance with the system of the present invention, an applicator assembly or device is provided to dispense a dry inoculant product. A control system coupled to the applicator assembly monitors and controls the rate and amount of the inoculant applied to the forage material. A data collection means collects and stores data regarding measured parameters of the forage material and applied inoculants. The control system comprises various types of sensors to measure parameters such as the feed rate of the crop, the moisture content of the crop, and the relative humidity of the surrounding environment. Data measured by the sensors is input to a controller which in turn generates outputs to the dispensing device to adjust the rate and amount of inoculants applied to the forage material that has entered the baling machine, but has not yet been baled. Accordingly, the control system regulates applied inoculants in real time to take into account specific measured parameters. The control system further comprises a human machine interface (HMI) including various user interface screens generated by software or firmware associated with the controller allowing the operator to control dispensing of the inoculants. The HMI specifically includes four general categories of operator screens, namely, screens for automatic control, manual control, semi-automatic control, and screens that display the system status.

The applicator assembly further includes a bin or container for holding the inoculants to be dispensed and a means to controllably dispense the inoculants from the container. In a preferred embodiment, an auger is disposed in the bottom of the container and the auger is powered by a speed controlled motor. The auger has a discharge end or outlet that discharges the inoculants for delivery to the portion of the baling machine that takes up the forage material. Optionally, a blower communicates with the outlet of the auger to assist in conveying the inoculants to the designated area in the baling machine where the exposed forage material travels. The bin is mounted above the point where the inoculants are delivered so in some cases, gravity alone may be adequate for dispensing the inoculants to the desired location within the processing machine, namely, a baling/chopping machine.

The applicator device can be conveniently mounted to the side or top of the baling/chopping machine. The auger and blower can be disposed in an optimum manner with respect to the incoming stream of forage material so that the auger/blower evenly applies the inoculants to the incoming forage material.

With the system and method of the present invention, a number of benefits are realized with respect to selectively applying desired inoculants. The present invention provides a convenient and economical retrofit solution for applying inoculants to forage materials to be chopped/baled.

BRIEF DESCRIPTION OF THE DRAWINGS

FIG. 10 is a schematic diagram illustrating the system of the present invention with respect to placement of system sensors in the intake area of a baling machine;

FIG. 10A is an enlarged schematic diagram illustrating one example of contact-type sensors usable in the system of the present invention;

FIG. 10B is an enlarged schematic diagram illustrating one example of non contact-type sensors usable in the system of the present invention;

FIG. 18 is another example HMI in the form of a user interface screen that can be displayed on the controller for displaying a calibration function allowing an operator to set the expected forage amounts based on the travel length of the baling/chopping machine.

DETAILED DESCRIPTION

The system and method of the present invention provides the delivery of inoculants to forage material that is processed for baling/chopping. More specifically, the inoculants are provided to forage material that has been harvested, and is to be baled for storage and subsequent use. The system of the present invention is conveniently mountable to a conventional baling/chopping machine. Hereinafter, reference to a "baling machine" is also understood to be a reference made also to a chopping machine.

Accordingly, in one aspect of the present invention, a system is provided for delivering selected amounts and types of inoculants to forage material.

In another aspect of the present invention, a method is provided for delivery of the inoculant material.

In yet another aspect of the present invention, a combination is provided for an inoculant delivery system and a baling machine.

Figure 1:
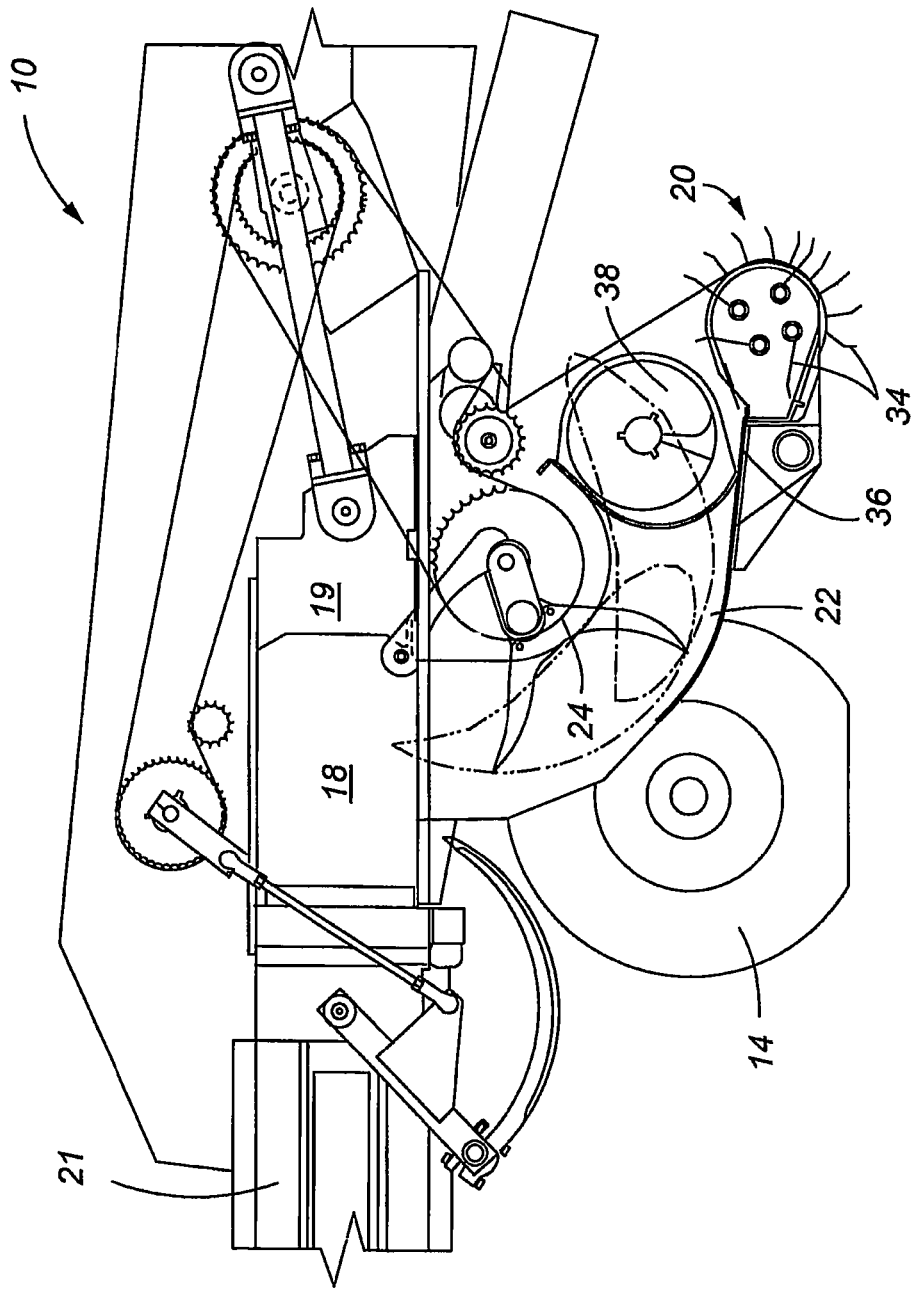
FIG. 1 is a schematic view of a prior art square baling machine.

Referring to FIG. 1, a prior art square baling machine is illustrated. The particular baling machine illustrated in this figure corresponds to the invention disclosed in the U.S. Pat. No. 5,842,335, which is incorporated herein by reference for purposes of disclosing a known baling machine of the type which produces square bales. Typically, the baling machine or baler follows a mowing machine that cuts and crimps the forage, and discharges it into windrows. A raking device may be used to turn the hay over in order that the windrow can more completely dry. The baler collects the cut crop directly from the windrow and subsequently shapes and compresses the hay into a desired shaped bale for storage and subsequent use. The baler shown in FIG. 1 may, for example, be pulled behind a tractor that cuts the hay in the field.

FIG. 1 shows the square baler 10 mounted on a wheeled chassis including a pair of laterally spaced wheels 14. The chassis carries a horizontally extending baling chamber 18 that is centered between the wheels. A plunger 19 reciprocates in a fore and aft motion within the baling chamber 18 for compacting the received forage material into cubical/square shaped bales. A windrow pickup assembly 20 is also supported on the chassis and is disposed in front of the wheels for picking up a windrow of crop material as the baler is advanced along a path of travel by the towing vehicle (not shown). A loading duct 22 is disposed between the pickup assembly 20 and the baling chamber 18, and includes a stuffing mechanism 24 that transfers crop material from the pickup apparatus into the baling chamber, and pre-compresses the material prior to advancing it into the baling chamber 18. A plurality of laterally spaced tines 34 of the pickup assembly 20 are driven upwardly and rearwardly to transfer the crop material from the ground to a laterally extending pan 36. One or more augers 38 may be disposed on opposite sides of the pickup assembly 20 to convey crop material from the lateral edges of the pickup assembly to the center of the machine in alignment with the duct 22. The converged flow of crop material is subsequently transferred to the duct 22 by the stuffer 24. The plunger 19 is reciprocated within the baling chamber 18 so that each new charge of the crop material passing into the chamber is compacted rearwardly during a compaction stroke of the plunger 19. As the crop material is compacted, it travels rearwardly into a squeeze mechanism 21 having moveable rails to apply inward pressure in order to shape the bale prior to reaching an outlet of the device. A suitable tying mechanism (not shown) is also provided for binding the bale prior to being ejected from the outlet.

Figure 2:
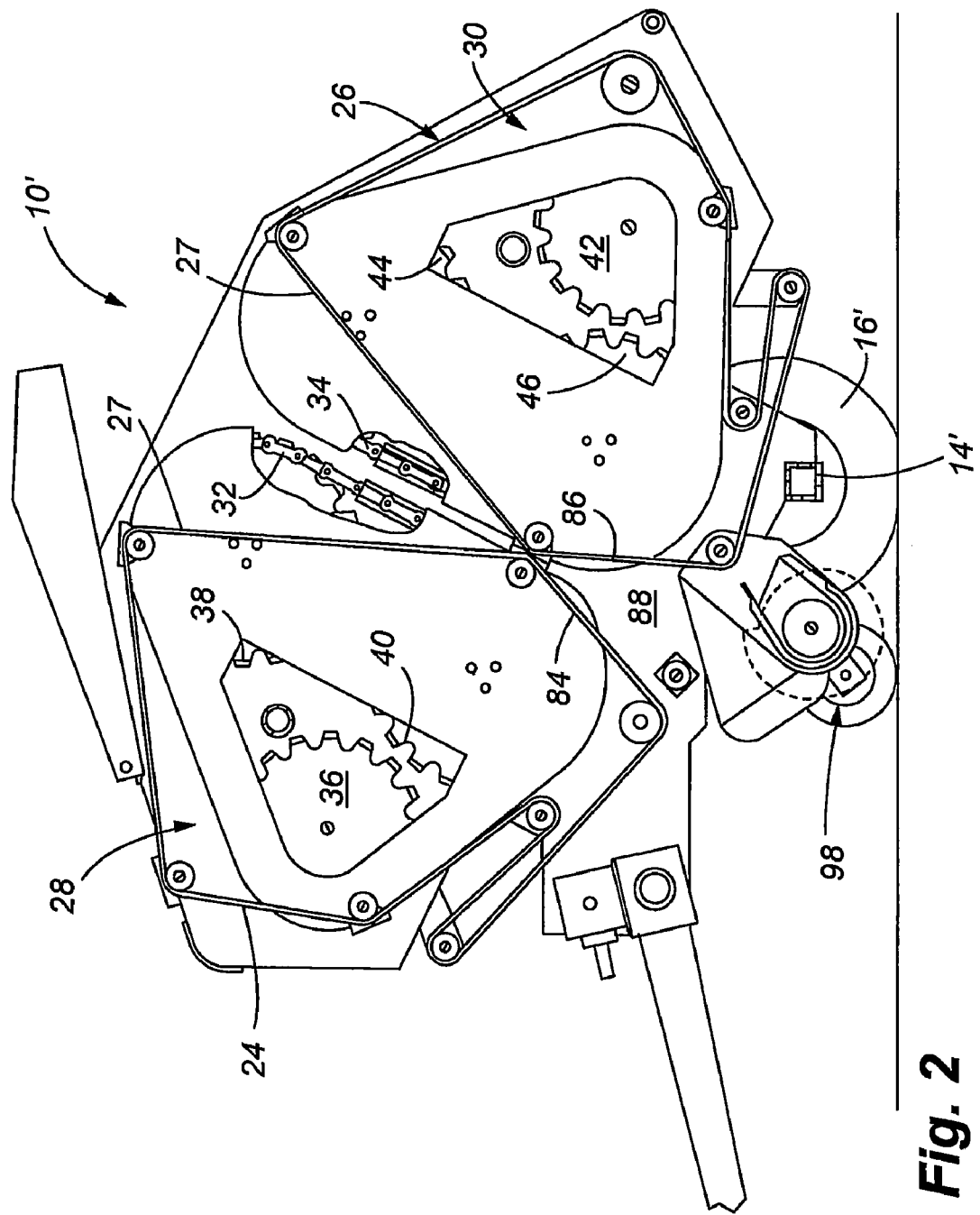
FIG. 2 is a schematic view of a prior art round baling machine.
Figure 3:
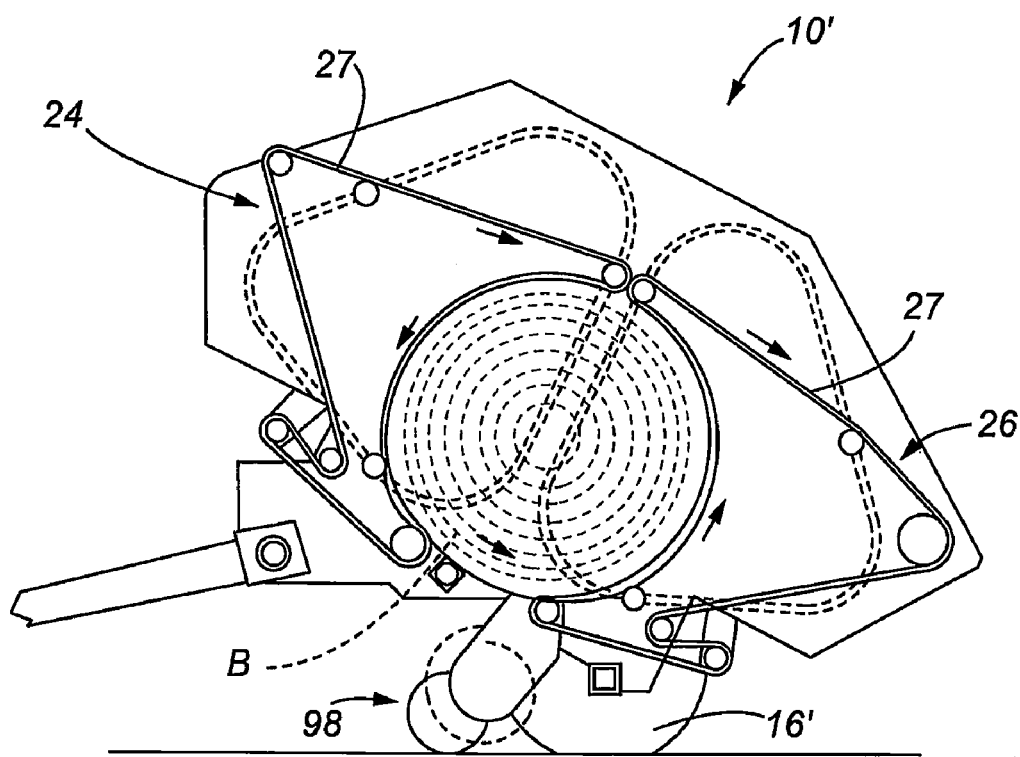
FIG. 3 is another schematic view showing the round baler of FIG. 2 manipulating an amount of forage material to create a round bale.

Referring to FIGS. 2 and 3, an example round baling machine is illustrated. The particular baling machine illustrated in these figures corresponds to the round baling device disclosed in U.S. Pat. No. 5,136,831, the disclosure of which is hereby incorporated by reference for purposes of teaching a round baler. This round baler 10' is also mounted on a frame including an axle 14' supported by spaced ground wheels 16'. This particular machine has the capability of forming large round bales on a continuous basis. Specifically, the baler has mirror imaged front and rear sets 24 and 26 of endless flexible bale rolling members, preferably in the form of side-by-side endless flexible belts 27. The baler also includes front and rear control mechanisms 28 and 30 with endless flexible chains 32 and 34 arranged in triangular patterns and mounted over rotatable sprockets 36, 38, 40 and sprockets 42, 44 and 46, respectively. The front and rear control mechanisms 28 and 30 each include spaced positioning rollers which span the baler to interconnect the rear chains 34.

Formation of a round bale of desired density is accomplished by applying a desired level of pressure on the crop material as it is rolled by the rolling members 24 and 26. As the baler is towed across a field, the pickup assembly 98 continually lifts windrow materials off the ground into the baling chamber 88. The materials are acted upon by the counter-moving belt stretches 84 and 86 to cause the material to tumble forwardly within the chamber 88.

Referring to FIG. 3, a bale B is shown in full size as it has been formed within the machine. Once the bale reaches full size, it is lifted into a raised position as fresh material continues to enter the baler beneath the original bale. The full size bale in its raised position can be released from control of the forming belts by presenting the bale to a rearwardly inclined ramp so that the bale may be discharged from the baler by gravity down the ramp.

With respect to the system of the present invention, as described below, sensors may be conveniently mounted in the intake area directly adjacent the pickup assembly of the baler so that the necessary measurements/observations can be taken for the incoming crop material, and then immediately followed by an appropriate application of the inoculants as the forage material passes through the intake area. It shall be understood that the sensors of the present invention can appropriately mounted with varying types of baling machines in order that the sensors can take appropriate measurements just upstream of the flow of material prior to the forage material receiving an application of the inoculants. One of skill in the art will appreciate that sensors may be alternatively mounted near the inoculation application point wherein moisture, etc., are measured after the inoculant is applied. In this embodiment, the sensors are located downstream of the inoculant application such that the moisture measurement of yet to be bailed material is obtained. That measurement then may be used to selectively alter the amount of inoculant applied to the material associated with the next bail. For example, the sensors may be located prior to the plunger (for example, 0 to 6 ft. from the application point) where continuous measurements are obtained. Inoculant application adjustments could then be made as a function of the continuous measurements to ensure accurate application of inoculant to each bail.

Figure 4:
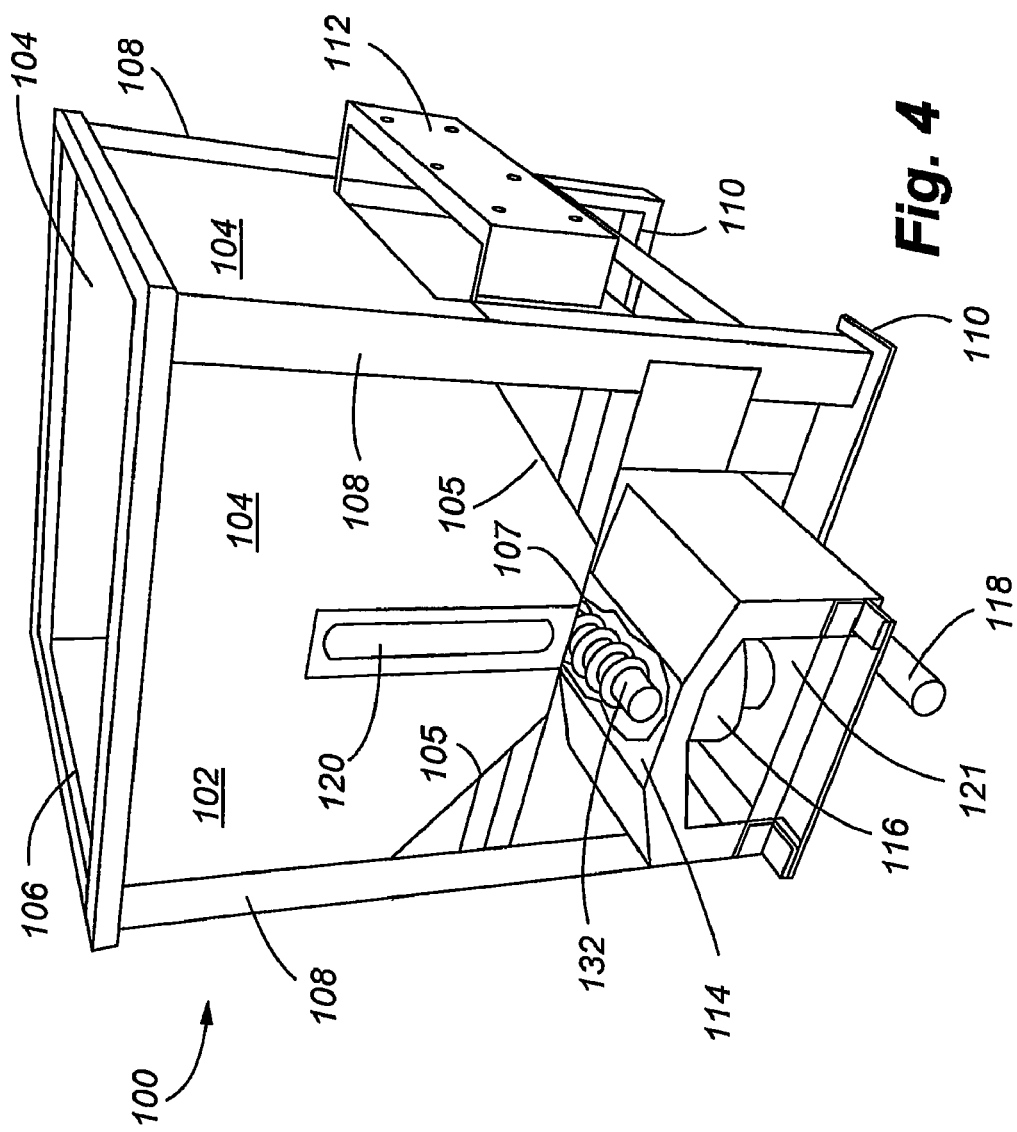
FIG. 4 is a perspective view of the container or bin associated with the dispensing apparatus of the present invention.
Figure 5:
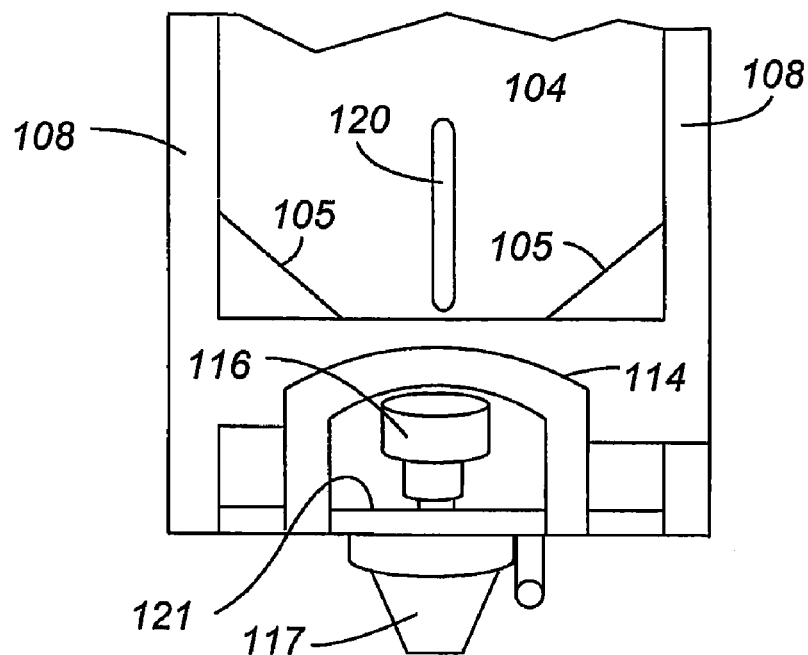
FIG. 5 is a fragmentary front elevation view of the bin.

Referring to FIGS. 4 and 5, an applicator assembly 100 is illustrated which is used to dispense a dry inoculant product. As discussed further below with reference to FIG. 7, the applicator assembly can be directly mounted on the baling machine to dispense a controlled amount of inoculant onto the forage material prior to the material being baled. The applicator assembly includes a product bin or container 102 defined by plurality of sidewalls 104 including a converging lower portion 105 which funnels the inoculant product into the very lower most or bottom 107 of the container. The top opening 106 of the container may receive a cover (not shown) to prevent the inoculants from being blown out of the container during high wind conditions or from becoming wet from rain and therefore not easily transported. The container/applicator assembly is supported by vertical supports 108 located at each corner of the container. Lower horizontal supports 110 stabilize the lower ends of the vertical supports 108 and the supports 110 act as a bottom mount. A side mounting bracket 112 is provided for directly mounting the container 102 to the baling machine. In addition to the side mounting bracket 112, other mounting brackets can be fashioned to enable the container to be mounted to the particular type of baling machine used. As also shown in FIG. 4 by the broken lines, a dispensing auger 132 has one end which protrudes from the bottom 107 of the container for dispensing a metered amount of inoculant product. The rotational speed of the auger determines the rate at which inoculant material is dispensed. The auger dispenses the inoculant product into an outlet receiving container 116 that is mounted on plate 121. The outlet receiving container 116 has a lower end that communicates with a blower motor 117 that extends below the plate 121. An outlet cover 114 is provided to prevent inoculate material from being blown out of the receiving container 116 during high wind or rain conditions.

A conveying line 118 is provided for conveying the inoculate product from the receiving container 116 to the forage material. The conveying line 118 communicates with the bottom discharge end of the container 116 and the blower motor 117. The blower motor provides the motive force for conveying the inoculant product through the conveying line 118. The blower is optional as the conveying line can be positioned for gravity delivery of the inoculant product to the desired location within the intake area of the baling machine.

A sight glass 120 is provided on one of the sidewalls 104 in order for the operator to visualize the amount of inoculant product remaining in the container. The container may also incorporate level sensors (not shown) which alert the operator to a low level of inoculant product within the container. For example, the sensors can be mechanical switches or electronic sensing devices such as capacitive switches that warn the operator that the container is low on inoculant product.

Figure 6:
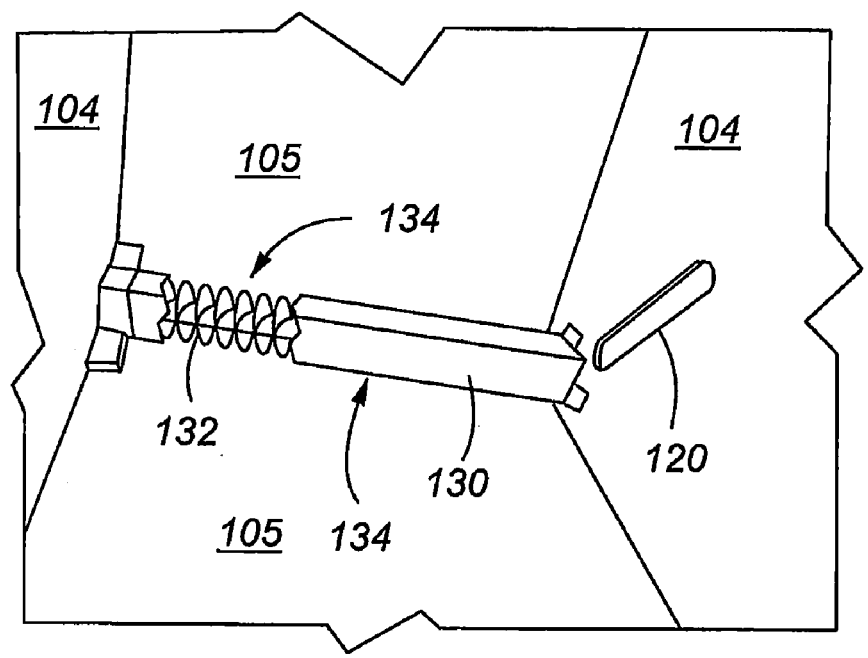
FIG. 6 is an enlarged fragmentary perspective view of the interior of the bin with an auger cover shown partially broken away to expose the auger.

Referring to FIG. 6, an overhead perspective view is provided of the interior of the container illustrating an auger cover 130 which covers the auger 132. The auger cover can be in the form of an upside down v-shaped plate as shown that covers the full length of the auger. Inoculant product communicates with the auger 132 in the lateral gaps or spaces 134 located on both sides of the auger cover 130. The auger cover helps to ensure the auger meters a consistent amount inoculant material that otherwise might be unduly compressed if the inoculant material was allowed to directly contact the auger overhead. More specifically, consistency of the dispensing rate of the auger can be affected by the inoculant product height in the container if in direct contact with an exposed auger. With an exposed auger, as product is dispensed, the pressure on the exposed auger decreases and the flow rate of the product will accordingly decrease. Accordingly, the auger cover 130 acts a flow regulating device and the cover 130 removes the variable downward pressure on the auger from the product. Thus, the side or lateral entry of the inoculant product into contact with the auger helps to ensure repeatability in terms of the rate at which inoculant product is dispensed by the auger. The auger is secured at each end of the container by bearings (not shown) mounted to the exterior sides of the opposing sidewalls.

During operation, the auger rotates at a selected speed by a speed controlled motor (not shown). The motor speed is controlled by a controller as discussed below. The control system of the present invention allows an operator to adjust the motor speed manually or automatically to dispense a desired amount of the inoculants. The v-shape of the container facilitates even and steady flow of the inoculant product into contact with the auger.

Figure 7:
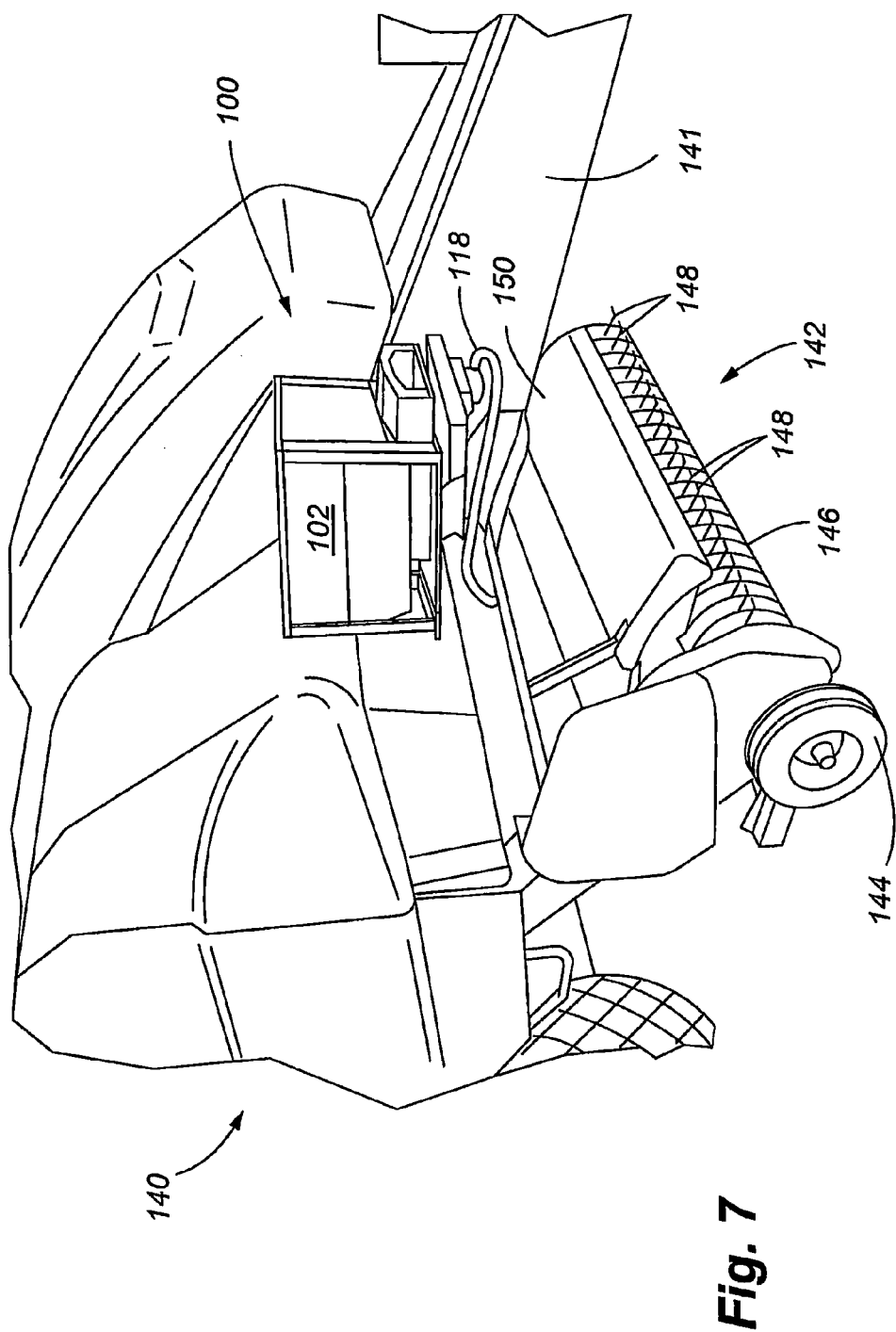
FIG. 7 is a perspective view of an example baling machine with the dispensing apparatus of the present invention mounted adjacent the intake area of the baling machine.

Referring to FIG. 7, an example baling machine 140 is illustrated with the applicator assembly 100 mounted to the towing tongue 141 of the baling machine 140. The particular baling machine illustrated in FIG. 7 is, for example, a Hesston® Baler, which is a large rectangular baling device that may be towed by a tractor. Although a particular type of baling machine is illustrated in FIG. 7, it shall be understood that the applicator assembly of the present invention is adaptable for mounting to any type of baling machine in which the conveying line 118 can be extended or shortened to enable the inoculant product to be applied to the incoming forage material located at the throat or intake opening of the baling machine.

With the example baling machine of FIG. 7, an uptake area generally represented by 142 is a location at which the forage material is received. The uptake assembly 142 is supported at each end by support wheels 144. A pick-up reel 146 including a plurality of rotating pick-up teeth 148 transfer the windrow of forage material (not shown) into the machine. A cover 150 is disposed over the pick-up reel to channel the forage material into the machine.

Figure 8:
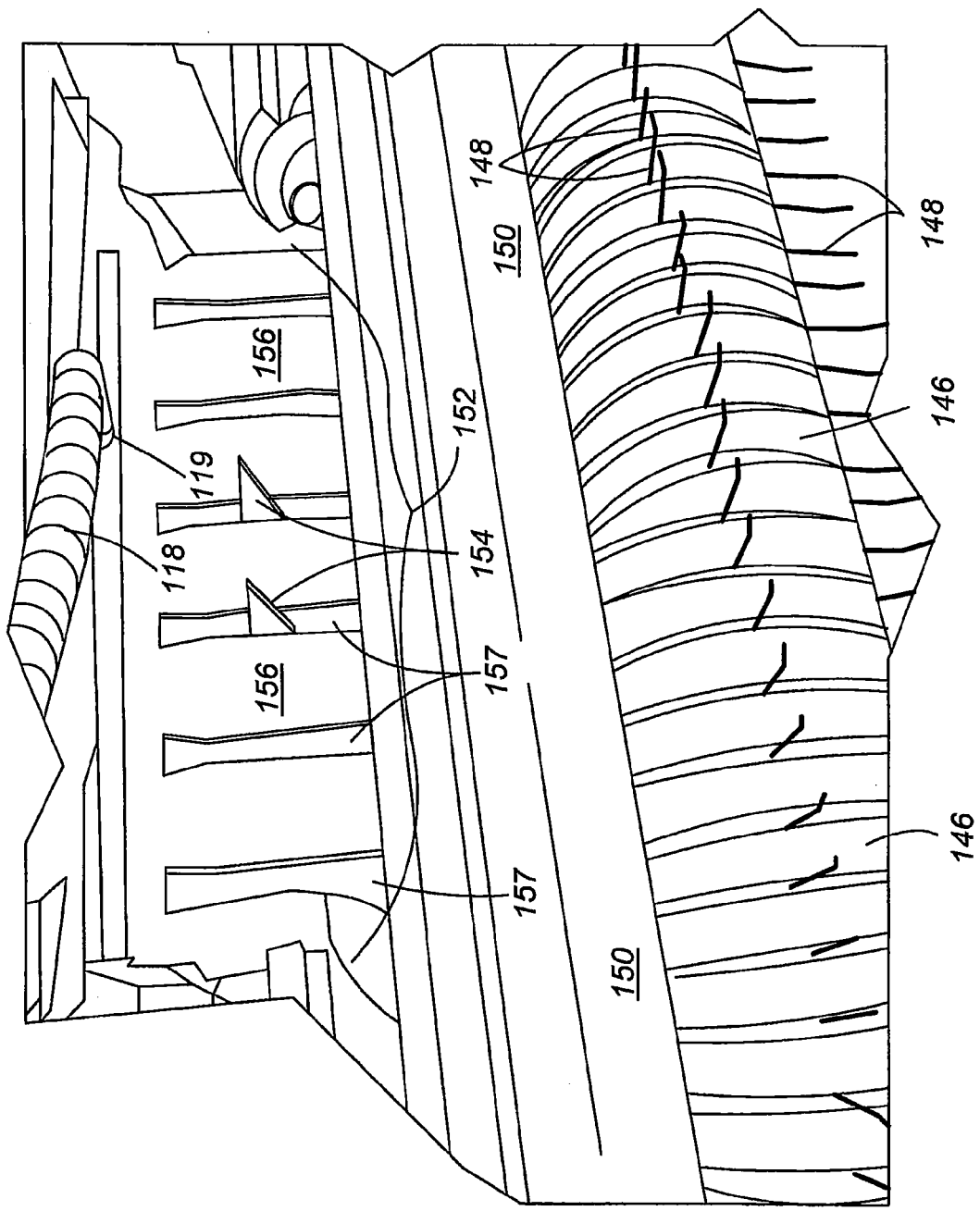
FIG. 8 is a greatly enlarged fragmentary perspective view showing the intake area of the example baling machine illustrated in FIG. 7 and showing the location where the inoculants are dispensed from a conveying line connected to the dispensing apparatus.

Referring to FIG. 8, a greatly enlarged perspective view is provided of the intake opening or throat in which the forage material is received for subsequent passage to the baling chamber (not shown). Initially, the forage material is lifted from the ground by the upward motion of the rotating pick-up teeth 148. After the forage material is received between the cover 150 and the pick-up reel 146, the forage material continues in a downward motion by the force of the rotating pick-up teeth 148 and the opposing feed teeth 154 that also rotate in a downward fashion. The teeth 154 protrude through slots 157 of the feed manifold 156. The feed teeth 154 continually traverse through the slots 157 in the downward motion to convey the forage material to a loading duct that rises upward to the entry of the baling chamber. The loading duct acts as a final conveying means for transport of the forage material into the baling chamber.

Figure 9:
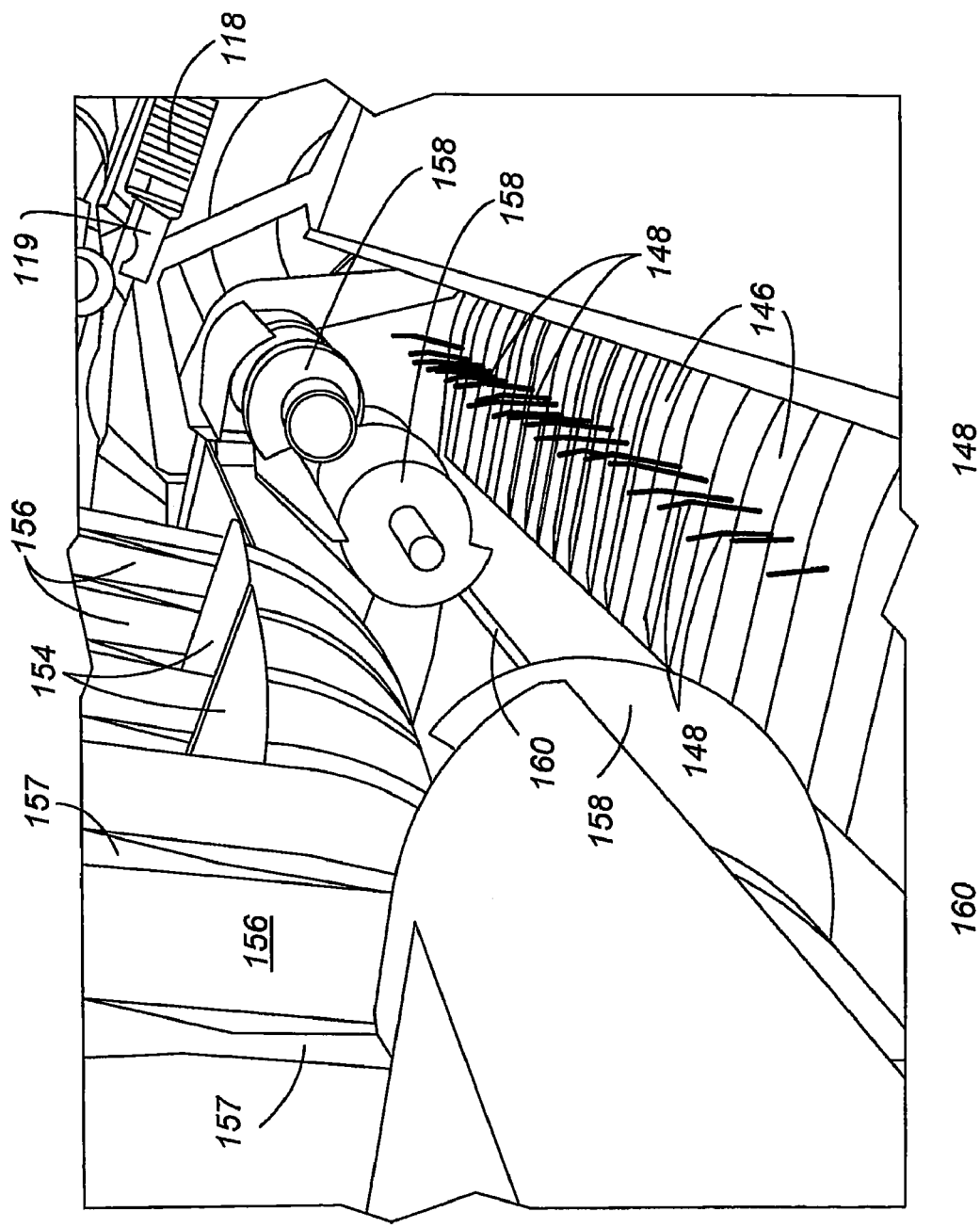
FIG. 9 is another greatly enlarged fragmentary perspective view showing the location where the inoculants are dispensed from a conveying line connected to the dispensing apparatus.

Also referring to FIG. 9, the throat or intake opening is shown by the bracket 152 and defines the confined area in which the forage material travels just prior to being conveyed to the baling chamber by the loading duct (not shown). A plurality of intake augers 158 are disposed on lateral sides of the intake area, and the side augers 158 are rotated to cause the forage material to converge within the intake area 152. There may be one or more augers disposed on each lateral side of the intake opening 152. The inoculant product is delivered by the conveying line 118 to the space defining the intake opening 152. As shown, the conveying line 118 includes an outlet 119, and the inoculant product (not shown) exits the outlet 119 for direct application onto the forage material. The outlet 119 may be configured in various ways to best disperse the inoculant product across the width of the intake opening 152. For example, various shaped and sized nozzles (not shown) may be secured to the outlet 119 for even distribution of the inoculant product across the intake opening 152.

The lateral plate 160 which abuts the manifold 156 provides a convenient location for mounting of the contact type sensors that are used to sense the moisture content of the forage material as it enters the intake opening 152. The non contact type sensors can be mounted in the intake opening above the plate 160 and above a normal height of the forage material passing through the intake opening.

Now referring to FIG. 10, a schematic diagram is provided of the system of the present invention. As shown, the intake area 142 includes the pick-up reel 146 and plurality of pick-up teeth 148 that convey the forage material towards the feed teeth 154 protruding through the manifold 156. In this small gap or space between the feed manifold 156 and the pick-up reel 146, various types of sensors may be mounted for measuring the moisture content of the forage material as discussed below. The forage material is conveyed by loading duct 161 into the baling chamber 163. The plunger 165 moves in a reciprocating fashion to compact the forge material in the baling chamber 165. The inoculant container 102 holds a quantity of inoculants to be dispensed by the dispensing auger. Conveying line 118 conveys the inoculants to the specified location where the forage material is exposed so the inoculants can be evenly distributed. The inoculants are applied prior to the forage material being conveyed to the baling chamber. The amount of inoculants applied is determined by a controller 200. The moisture content of the forage material is measured by one or more sensor assemblies 170 and 178. The location(s) at which measurements are taken of moisture can be referred to as measurement point(s). A humidity sensor 210 also supplies inputs to the controller where the controller adjusts the amount of inoculants applied by speeding up or slowing down the motor that drives the auger. The controller is responsive to the inputs to provide an adjusted auger rotational speed within a very short time span. Thus, the inoculants are applied in varied amounts to account for forage material that may have significant moisture content differences over short windrow distances.

Also referring to FIG. 10A, one type of sensor that can be used includes a contact type sensor assembly 170. For the contact type sensor assembly 170, the assembly may include a mounting surface 172, supports 174, and conducting sensors 176 mounted on the mounting surface 172. The supports 174 in this figure may also represent load cells that can provide signals to a remote display or controller (not shown) for indicating the weight of the incoming forage material. The supports 174 may be mounted on the plate 160. Contact type sensors may include conductive strips that provide a variable voltage signal back to a controller of the control system based upon the conductivity measured by the presence of moisture within the forage material. Other examples of contact sensors may include probes that protrude into the path of the forage material, and contact of the probes against the forage material can effectively measure moisture content.

In addition to or in lieu of the contact sensor assembly 170, a non-contact type sensor assembly 178 may be used as shown in FIG. 10B to measure moisture. The non-contact type sensors may include ultrasound sensors that measure distance or infrared sensors 182 that measure moisture content. The volume of the forage material can be calculated as a function of the clear distance measured by the ultrasound sensor. With respect to the non-contact type sensors as shown in FIG. 10B, sensing beams 184 have direct lines of sight with respect to the incoming forage material that passes below.

In accordance with the method and system of the present invention, manual or automatic control of the dispensing operation can be achieved. As previously mentioned, the application rate of the inoculant onto the forage material is determined by calculations including the forage feed rate into the baling machine (such as pounds per second), the moisture content of the forage material, and the relative humidity. When using an automated control system of the present invention, one or more of the values can be input into a controller and used to calculate the optimal dispensing rate for the inoculant product.

The feed rate of the forage material into the baling machine can be manually or automatically determined by the control system. Manual entry of feed rate values or automatic measure rates can be entered into the control system for calculation of the dispensing rate of the inoculant product. Automatic feed rate data can be measured by the control system using bale weight and cycle time. The bale weight can be input into the control system at the end of the baling cycle in which a single bale of hay has been produced. Each bale cycle can also be measured in terms of time to determine the cycle rate for each bale of hay. The feed rate would then be calculated in pounds per second. Another method for determining the desired dispense rate is to use the moisture content of the forage material and volumetric measurement of material passing through the intake area to calculate the intake in pounds per second. Volumetric measurement can be accomplished by the non-contact type sensors mounted at the intake opening over a reference plate in the bottom of the intake area, such as the plate 160 mentioned previously. As forage material passes through the intake, the actual volume of the forage material can be calculated in this manner. The moisture content of the forage material as measured at the intake opening is used to calculate pounds per second feed rate.

The inoculant application rate is adjusted for the moisture content of the forage material. The application rate is increased as the moisture content of the forage material increases. The moisture of the forage material is continuously measured at the intake opening of the baling machine prior to application of the inoculant and baling of the forage material. Moisture measurement of the forage material can be achieved using multiple means, to include the contact and non-contact sensors as described above. Examples of specific sensing methods include TDR technology (Time Domain Reflectometry) that measures a dielectric constant (the water content) of the material; NIR (Near Infrared) technology; and capacitive sensor technology. Further for example, the control system of the present invention may use moisture sensing devices with so various analog or digital outputs that best match the type of controller used. With NIR technology, the sensors are non-contact and would be positioned at the intake opening of the baling machine, as discussed above with respect to the non-contact sensor assembly 178. Other devices, such as TDR and capacitive technologies, require contact of the material and the sensors are therefore can be mounted on the plate 160 in the same manner as the contact sensor assembly 170. As noted above with respect to FIG. 10A, the contact sensors may simply be mounted on a mounting plate 160 and placed in direct contact with the incoming forage material.

Relative humidity is one factor that should be taken into consideration for precise application of the inoculant products. The application of the inoculant product is increased as the relative humidity increases. Of course, the forage material moisture values typically increase with humidity as well. One example of industry standard moisture corrections for humidity levels is provided in the table below.

| Relative Humidity | Increase in Moisture Value |
|---|---|
| 60% | 2.5% |
| 70% | 3.3% |
| 75% | 4.0% |
| 80% | 5.0% |
| 85% | 6.6% |
| 90% | 10.0% |

The control system of the present invention continuously measures humidity and moisture content, and calculates corrections for these parameters to determine the correct amount of inoculant product to be administered. The control system of the present invention is also capable of collecting data for production records and analysis. The particular data that can be collected with the present invention includes: 1) total tons of treated and baled forage material produced; 2) total bales produced; 3) tons per hour; 4) average moisture content of the forage material for each bale; 5) inoculant used per ton; 6) total inoculant used; 7) applicator run time; 8) total baling/chopping hours; 9) forage temperature; 10) ambient temperature; and 11) production session hours. The data collected can be saved to removable storage devices accessible on the control system hardware. Production records can than be transferred to other computer systems as desired. The data collection and transfer can be achieved using wired or wireless communication networks to include the incorporation of intranet networks between designated organizations or the use of the Internet.

As further described below, the control system of the present invention comprises a programmable control device such as a work station computer or a programmable logic controller (PLC) with a HMI, such as a touch screen, or a conventional user display with an input device such as a keyboard. The operator uses the HMI to operate the inoculant dispensing system. The HMI may comprise various user operator screens in order to control the dispensing system as also discussed below, to include the provision of various operational modes such as an automatic control mode, a manual control mode, a semi-automatic control mode, and status screens that show various system parameters in real time. These different operator screens can be accessed from push buttons on the front of the HMI panel or from traditional selection menus in software incorporated in the control system. The blower and auger can also be activated from various screen locations. The blower is optional for each process, as previously noted since gravity flow in some circumstances may be adequate for dispensing the inoculant material.

Activation of the auger commences the dispensing process. Data is collected throughout a production session and may be stored until the controller is reset, or the operator otherwise decides to transfer the data. Typically, the storage device is replaced or cleared between production sessions. A reset function can be provided to clear all production records in the controller.

The HMI also includes a setup screen for entering calibration information. Calibration factors for various parameters to include moisture, humidity, and the machine feed rate can be set in this screen.

In the event the control system in the present invention is used with a baling machine that is not equipped with any sensing devices, then the manual mode is best for operation in which the forage feed rate, moisture, and humidity can be entered from this mode.

Automatic operation results in control of the application of the inoculant using real time measured inputs of the feed rate (pounds per second), percent moisture in the forage material, and the ambient humidity. The application rate is continually calculated and adjusted to accurately apply inoculant to the forage material. Dispensing of inoculant only occurs when forage material enters the baler intake area. When the control system senses forage material entering the baler intake, than the inoculant dispensing will be activated. As discussed below, moisture content, application rate, and bales per hour is monitored and displayed on one or more of the user screens.

The semi-automatic operation mode monitors moisture content, application rate, and bales per hour. The application rate of the inoculant can also be manually set by the operator. As with the automatic control mode, moisture content, application rate, and bales per hour are monitored and displayed on one or more user screens.

In the manual operation mode, this requires operator input for the measured moisture content, application rate, and bales per hour. Dispensing of the inoculant in this manual mode only begins when the operator activates the machine auger. Dispensing continues until the operator deactivates the machines auger. The manually entered values for moisture content, application rate, and bales per hour are displayed on the screen. Additionally, depending upon the presence of particular sensors, one or more of the other parameters may be shown, such as the actual measured moisture content, the measured dispensing rate, and the measured ambient humidity.

One or more status screens can display information that summarizes a production session such as the number of bales produced, the amount/rate of inoculant product used, the time period in which the session took place, etc.

Data can be collected for baled forage material specific to each bale produced. For example, during the baling process, each individual bale can be tagged with a marker containing a bar code, and the bar code contains information corresponding to the amount/rate of the inoculant added to the particular bale, the measured moisture and humidity at the time the bale was produced, etc. The tag can be printed by a printing device that is mounted adjacent to the output of the baling device such that the tag can be automatically attached to the bale as it exits the baling machine. As necessary, a bar code reader can than be used to identify attributes of the bale as it was processed in the baling machine. Additional information can also be gathered using the bar code reference from the data collected by the control system.

Figure 11:
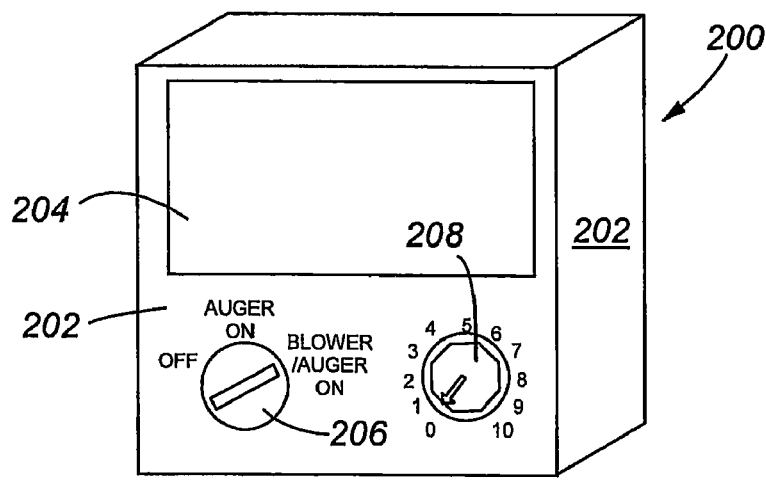
FIG. 11 is a perspective view of a controller in accordance with a preferred embodiment of the present invention.

Referring to FIG. 11, an exemplary controller 200 is illustrated in accordance with one preferred embodiment of the present invention. As previously mentioned, the control system of the present invention may be embodied in various forms to include a standalone work station computer, a programmable logic controller, or even a remote HMI interface that communicates with a central processing unit. The embodiment illustrated in figure 200 can be considered any of these possibilities and is illustrated in FIG. 11 in very general form. The controller 200 as shown includes a housing 202, and a visual operator interface including a touch screen area 204. Alternatively, the area 204 can represent a digital display in which the operator controls the system by manual operating controls incorporated on the housing. For example, one or more operating controls may be mounted on the housing, such as an auger and blower switch 206, and an auger speed control 208. For the auger and blower switch 206, the operator may manually turn the auger on, or simultaneously turn the blower and auger on. The manual speed control 208 allows the operator to adjust the rotational speed of the auger which in turn, affects the dispensing rate of the inoculant product.

Figure 11A:
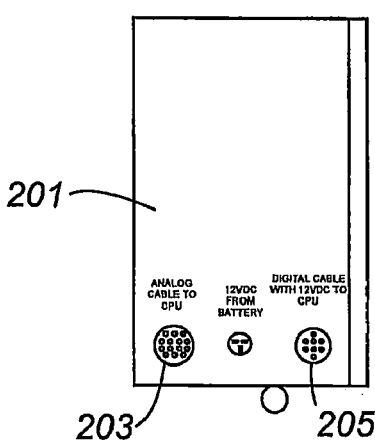
FIG. 11A is a side view of an electrical junction box associated with the controller
Figure 11B:
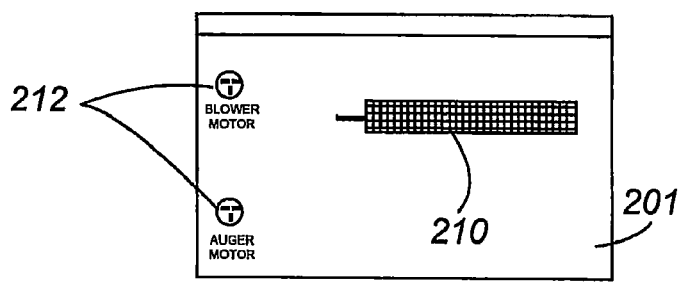
FIG. 11B is a bottom view of the junction box.

FIG. 11A illustrates a side view of an electrical junction box 201 in which various ports may be provided for interconnecting system inputs and outputs to the controller For example, analog cable port 203 is provided for analog inputs such as the moisture sensor or other hardware that provides inputs to the controller 200. Digital cable port 205 Is provided for digital inputs from system hardware, which could also include moisture level sensors that generate a digital signal. Referring to FIG. 11B, a bottom view of the housing 202 is provided in which various output ports are provided for sending signals to various output devices to include, for example, the blower motor and the auger motor. Other output ports 212 may be provided for controlling other outputs of the control system. FIG. 11B also illustrates a humidity sensor 210 which provides inputs to the controller to measure the relative humidity. As discussed, relative humidity is one of the parameters which is monitored to determine the optimal inoculant dispense rate. The humidity sensor 210 is conveniently mounted to the junction box; however, it shall be understood that the humidity sensor can also be located at other locations, such as on or adjacent to the container. Use of the junction box may provide a convenient solution for consolidating input/output lines however it shall be understood that the junction box is optional and other arrangement can be used for organizing input/output lines.

Figure 12:
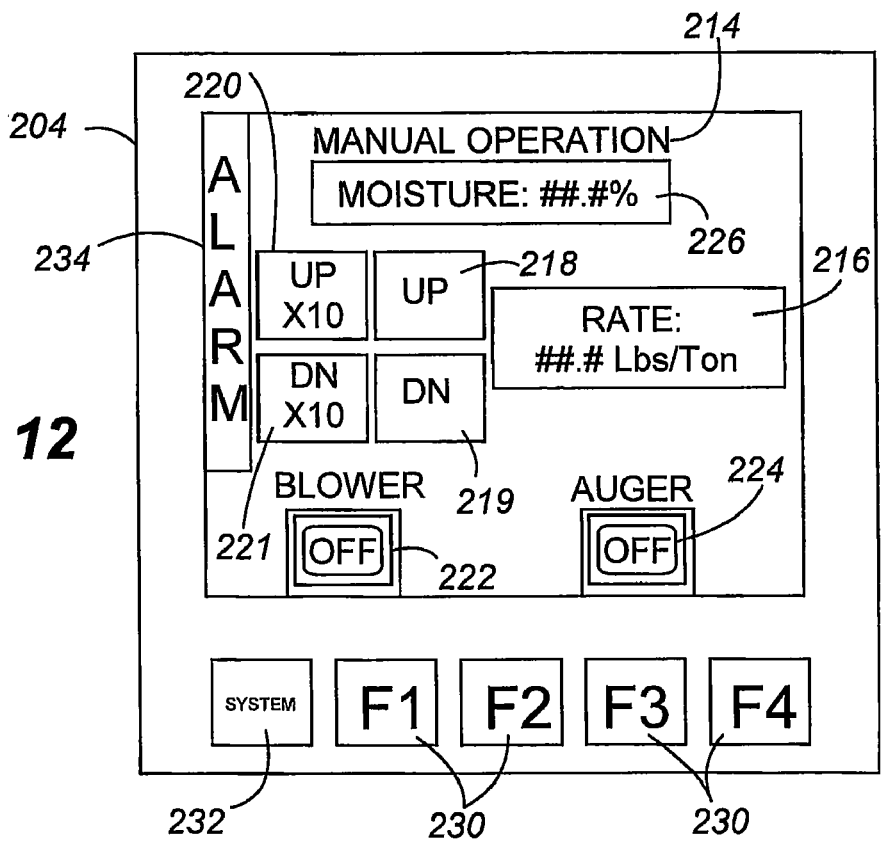
FIG. 12 is an example HMI in the form of a user interface screen that can be displayed on the controller for manual operation of the system.

FIG. 12 illustrates a user interface screen, such as one which may be illustrated on the touch screen area 204. It shall be understood that the touch screen area 204 can also be incorporated in a stand alone screen display in which all system controls are manipulated through the touch screen or through other input devices such as a keyboard and mouse. The particular user screen illustrated in FIG. 12 illustrates the manual operation mode 214. In this screen, the operator has the option of adjusting the dispense rate 216 of the auger, this rate being shown in pounds of inoculant per ton of forage material. The operator also has the option of adjusting the dispense rate of the auger by increasing or decreasing the voltage supplied to the auger motor which in turn changes the speed of the motor which drives the auger. For example, up button 218 if selected would increase the voltage to the DC drive motor by an increment of 0.1 volts, while selecting the down button 219 would reduce the voltage by 0.1 volts. Button 220 may provide a greater increment increase or decrease in voltage, such that selection of button 220 could, for example, increase the voltage to the DC drive motor by 1 volt, while the button 221 if selected would decrease the voltage by 1 volt. The motor speed controlled by voltage is calibrated to the auger dispense feed rate in pounds per ton. The dispense rate displayed can be in pounds per ton. This screen shown in FIG. 12 may also include other attributes such as a manual blower on/off switch 222, and a manual auger on/off switch 224. Thus, the operator could also control the blower and auger independently through this user screen.

The moisture content of the forage material is also displayed in this user screen at 226. This moisture content can either be that which is manually entered by the user, or which has been independently measured by a separate device. Alarm icon 234 provides the operator an alarm condition, which may provide the operator with indication of a system problem based upon a number measured events, or conditions which exceed pre-programmed dispense rates based upon input moisture and/or humidity values. For example, in the manual operation mode, if the operator enters a particular moisture content, and then manipulates the rate of dispense such that either a clearly excess or clearly inadequate amount of inoculant product is to be applied, the alarm 234 can be triggered. This alarm condition can be a visual and auditable alarm, and can also include a message that may be displayed (not shown) which explains the alarm condition to the user in a dialogue box appearing on the screen. Thus, the controller 200 may also communicate with the user's e-mail or other messaging capability in order to convey an alarm condition. For example, the controller may be linked to a user's email in a traditional wired/wireless communication network, or may be linked for transmission to the user's cellular phone.

The user interface in FIG. 12 also shows a system button 232, as well as various function buttons 230. The function buttons, labeled as F1, F2, F3, and F4, may correspond to other user screens selected by the user, such as the other displays discussed below to include the automatic operation mode, the semi-automatic operation mode, and the status screens. The system button 232 if selected can provide another user screen (not shown) which lists various system parameters to include installed hardware in the control system, various data parameters, algorithms used to set dispense rates, etc.

Figure 13:
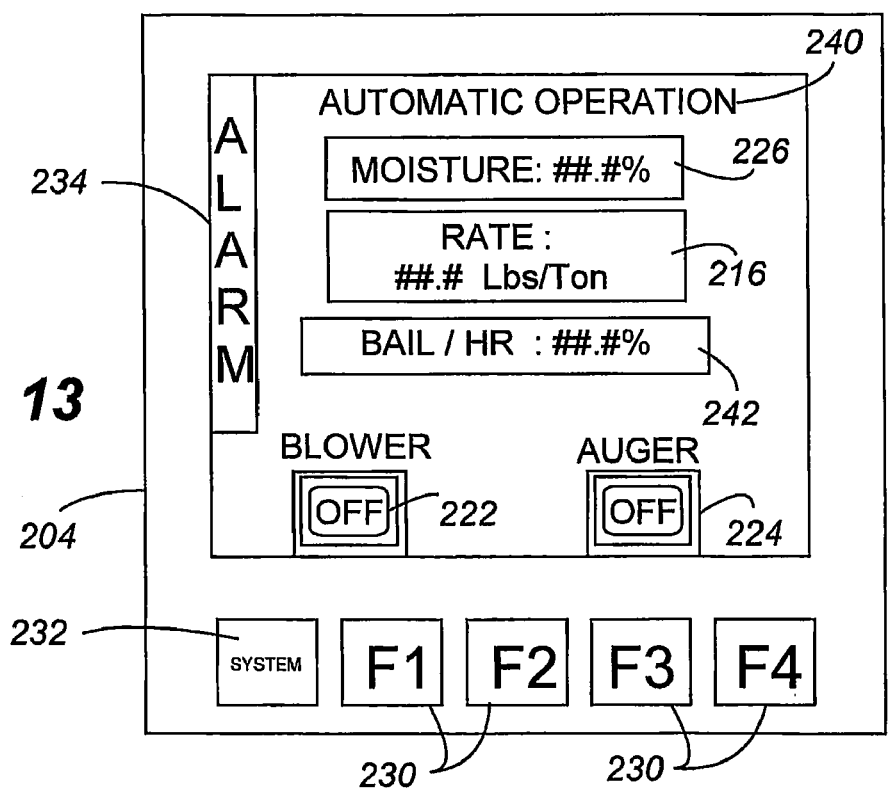
FIG. 13 is another example HMI in the form of a user interface screen that can be displayed on the controller for automatic operation of the system.

FIG. 13 illustrates another user interface screen, and more specifically, an automatic operation mode 240. In this automatic operation mode, the moisture content 226 displayed is the actual moisture content as calculated by the control system in conjunction with one or more of the sensors located at the intake opening 152 where the forage material passes. The application rate 216 is the real time application rate as measured by the current speed of the auger motor. The bales/hour display 242 is the actual number of bales produced per hour as the baling machine operates. The application rate is continually adjusted based upon the particular auger rate algorithms programmed used, that are based upon the moisture content, relative humidity, and intake rate of the forage material. In this automatic operation mode screen, the user still has the capability to turn on and off the blower and auger as shown. However, if the operator chooses to turn off the auger, this can result in a temporary delay of the information displayed since the controller will sense the stoppage of the auger and will therefore also cease dispensing of the inoculant product.

Figure 14:
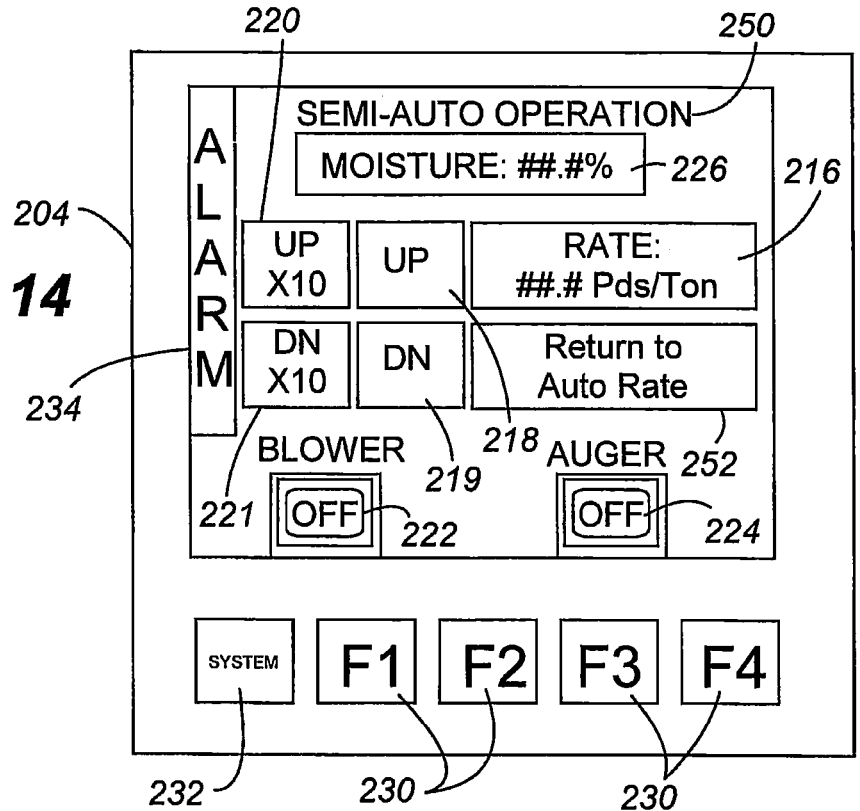
FIG. 14 is another example HMI in the form of a user interface screen that can be displayed on the controller for semi-automatic operation of the system.

FIG. 14 illustrates the semi-automatic operation mode 250 in which the operator may adjust the dispense rate of the auger, or return to the automatic mode by selecting button 252. In this semi-automatic operation mode 250, the moisture content of the forage material is also displayed at 226. The operator also has the option of turning on or off the blower and auger.

Figure 15:
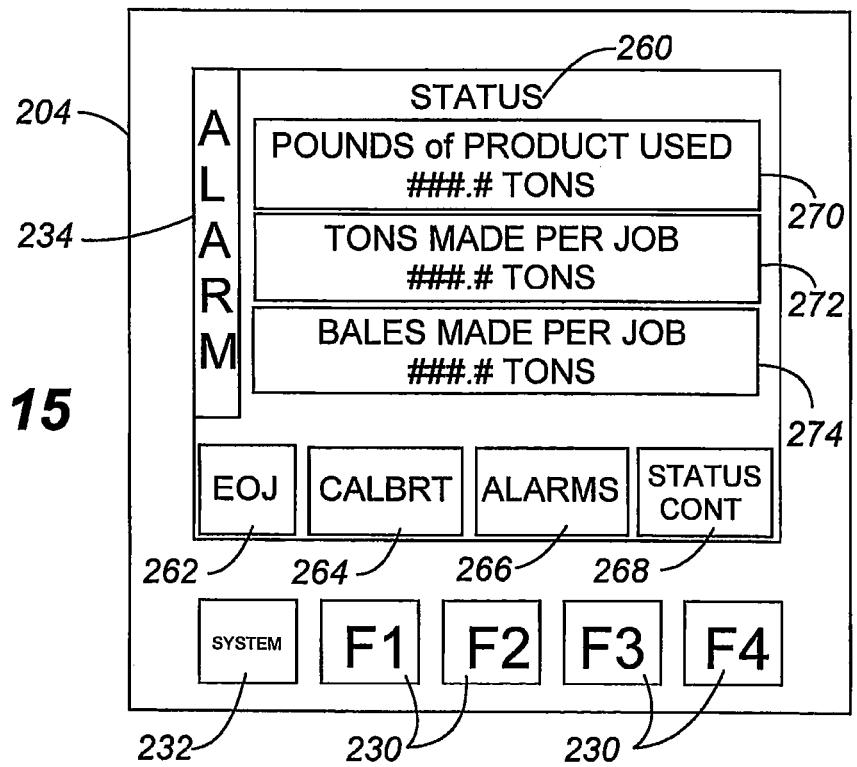
FIG. 15 is another example HMI in the form of a user interface screen that can be displayed on the controller for displaying a system status.

FIG. 15 illustrates an example status screen 260 in which various counters can be provided to the user. As shown in this figure, display 270 provides the total pounds of inoculant product used in the current dispensing operation in tons, display 272 provides the total baled forage material created during the job, and display 274 provides the total number of bales made during the baling session/job. This status screen 260 also provides other functionality to include an EOJ (End of Job) button 262 which allows the operator to signify the end of the job, in which the counters 270, 272, and 274 are reset. The status screen 260 also provides a calibration button 264 which leads the operator to another screen for calibration of the system, as discussed further below with respect to FIGS. 17 and 18. The alarms button 266 if selected provides a listing of alarms available for monitoring the system, as well as capability for the user to add additional alarm conditions as desired. The user has the ability to select and edit various alarm conditions. Button 268 if selected allows the operator to view another status screen for other measured system parameters, as discussed with respect to FIG. 16.

Figure 16:
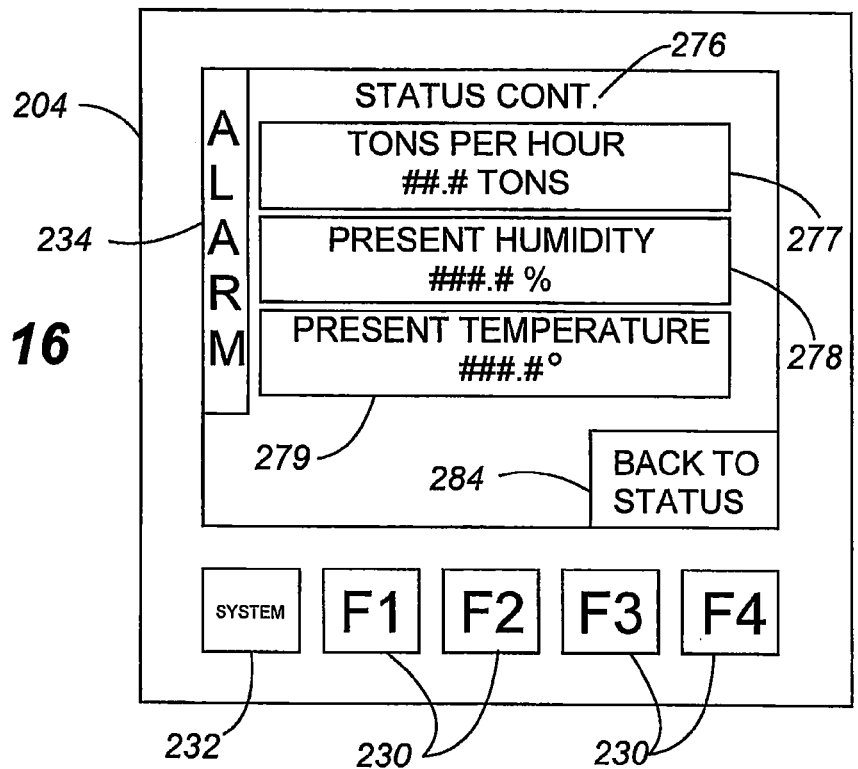
FIG. 16 is another example HMI in the form of a user interface screen that can be displayed on the controller for displaying additional information on the system status.

Referring to FIG. 16, an additional status screen 276 provided in which other parameters are measured/counted. For example, display 277 provides an indication of the number of tons of forage material produced per hour, display 278 provides the present relative humidity conditions, and display 279 provides a display of the present temperature. Button 284 if selected allows the operator to return back to the pervious status screen.

Figure 17:
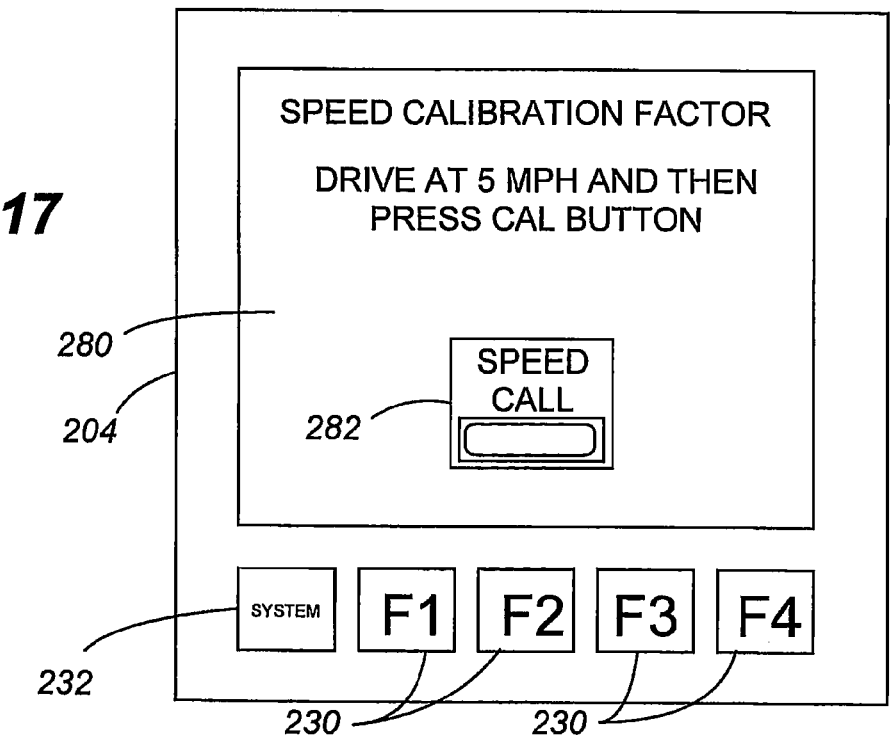
FIG. 17 is another example HMI in the form of a user interface screen that can be displayed on the controller for displaying a calibration function allowing an operator to calibrate the speed sensor installed on the baling/chopping machine.

The speed of the vehicle can be sensed by proximity sensors (not shown) mounted near one of the wheels of the vehicle. Referring to FIG. 17, a calibration screen 280 is provided which allows an operator to conduct a calibration of the speed sensor. As shown, instructions on the screen instruct the operator to drive the baling machine at a particular speed, and then to press the calibration button 282 which at that time measures the sensor input to the controller as related to the speed indicated on the calibration screen. This value will be used to calculate forage material pounds per foot as entered in user screen 290.

FIG. 18 shows another calibration related user screen 290 in which the user can set the amount of forage entering the baler/chopping machine in pounds per foot of travel distance in the display 292. From this entered value in display 292, the system uses this value to calculate the dispensing rate of the inoculant as related to the speed traveled.

In accordance with the present invention, a system and method are provided for accurately dispensing a desired quantity of inoculant product based upon real time data that regulates the amount of inoculants dispensed. The real time measurement of forage material moisture content enables the system to control the dispense rate in fine increments to account of varying moisture contents in the forage material that may occur over short distances as the baling machine travels. The control system of the present invention provides a number of user options for manual, automatic, and semi-automatic control based upon the type of baling machine to which the system is mounted. The automatic mode requires less operator effort, and assuming the baling machine is equipped with the proper sensors, the dispense rate of the inoculant product is automatically controlled without the necessity of operator intervention. However, the system controller of the present invention is flexible enough to allow manual intervention in the event the operator decides to override preset parameters for dispensing. The contact and non-contact type sensors retrofitted to the intake opening of the baling machine provide effective capabilities in measuring moisture content. The inoculant container may be easily mounted to the baling machine, and the robust construction of the dispense auger insures that a consistent dispense takes place.

What is claimed is:

1. A method of processing forage material, said method comprising:
    gathering forage material into a transport element of a baling machine above the ground;

measuring moisture content of the forage material at a measurement point after it has moved into the baling machine and measuring prior to baling of the forage material the measurement point be located in a gap between a feed manifold of the machine and a pick-up reel of the machine;

selectively applying inoculants to the forage material as the forage material passes the measurement point;

adjusting the amount of inoculants applied to the forage material based on a consideration of a moisture content of the forage material; and further transporting the forage material within the baling machine, compressing, and baling the forage material.

2. A method, as claimed in claim 1, further including:
measuring a relative humidity, and further adjusting the amounts of inoculant applied based upon a consideration of both the relative humidity and moisture content.

3. A method, as claimed in claim 1, wherein:
measuring of the moisture content is achieved by at least one moisture sensor located at an intake area within the baling machine such that adjusted amounts of inoculant may be applied to the forage material in which the moisture content has been measured and prior to baling of the forage material.

4. A method, as claimed in claim 1, wherein:
said measuring step is achieved by at least one of a contact type sensor or a non-contact type sensor.

5. A method of processing forage material, said method comprising:
gathering forage material into a baling machine in which the forage material is transported into the machine above the ground and is confined within the machine;

measuring moisture content of the forage material at a measurement point after it is gathered into the baling machine and has cleared a pick-up reel of the machine, and measuring prior to baling of the forage material with a non-contact type sensor;

selectively applying dry inoculants to the forage material as the forage material passes the measurement point; and further transporting the forage material within the baling machine, compressing, and baling the forage material.

6. A method, in claim 5, further including:
adjusting the amount of dry inoculants applied to the forage material based on a consideration of the moisture content of the forage material.

7. A method, in claim 5, further including:
measuring a relative humidity, and further adjusting amounts of dry inoculants applied based on a consideration of both the relative humidity and moisture content.

8. A method, in claim 5, wherein:
measuring of the moisture content is achieved by at least one moisture sensor located at an intake area of the baling machine such that adjusted amounts of dry inoculants may be applied to the forage material in which the moisture content has been measured prior to baling of the forage material.

9. A method of processing forage material, said method comprising:
gathering forage material by a pick-up reel, the pick-up reel moving the forage material into the machine and above the ground;

providing a feed manifold having a plurality of teeth, the feed manifold for further transporting the forage material into the machine, wherein a gap exists between the pick-up reel and the feed manifold;

measuring moisture content of the forage material at a measurement point in the gap after the forage material has moved beyond the pick-up reel;

selectively applying inoculants to the forage material in the gap as the forage material passes a measurement point;

adjusting the amount of inoculants applied to the forage material based on a consideration of a moisture content of the forage material; and further transporting the forage material within the baling machine, compressing, and baling the forage material.

\* \* \* \* \*